United States Patent
Kim et al.

(10) Patent No.: US 9,751,644 B2
(45) Date of Patent: Sep. 5, 2017

(54) THREE-DIMENSIONAL RIGID BALL DRIVING SYSTEM

(71) Applicant: KOREA AEROSPACE RESEARCH INSTITUTE, Daejeon (KR)

(72) Inventors: Dae-Kwan Kim, Daejeon (KR); Hyungjoo Yoon, Daejeon (KR); Wooyong Kang, Daejeon (KR); Yong Bok Kim, Daejeon (KR); Hong-Taek Choi, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 288 days.

(21) Appl. No.: 14/414,852

(22) PCT Filed: Jul. 24, 2013

(86) PCT No.: PCT/KR2013/006610
§ 371 (c)(1),
(2) Date: Jan. 14, 2015

(87) PCT Pub. No.: WO2014/017817
PCT Pub. Date: Jan. 30, 2014

(65) Prior Publication Data
US 2015/0166200 A1    Jun. 18, 2015

(30) Foreign Application Priority Data
Jul. 25, 2012    (KR) .................. 10-2012-0081146

(51) Int. Cl.
*H02K 5/173*    (2006.01)
*B64G 1/28*    (2006.01)
(Continued)

(52) U.S. Cl.
CPC ............... *B64G 1/285* (2013.01); *B64G 1/24* (2013.01); *B64G 1/32* (2013.01); *G05D 1/0808* (2013.01);
(Continued)

(58) Field of Classification Search
CPC . B64G 1/24; B64G 1/28; B64G 1/285; B64G 1/286; G05D 1/0808; B25J 9/126;
(Continued)

(56) References Cited

U.S. PATENT DOCUMENTS 3,517,562 A    6/1970 Houghton et al.
4,719,381 A *  1/1988 Miles .................... H02K 41/02
                                                    310/166
(Continued)

FOREIGN PATENT DOCUMENTS

JP    S6468775 A    3/1989
JP    H0635866 A    2/1994
(Continued)

OTHER PUBLICATIONS

ISA Korean Intellectual Property Office, International Search Report of PCT/KR2013/006610, WIPO, Oct. 30, 2013, 2 pages.

*Primary Examiner* — Tran Nguyen
(74) *Attorney, Agent, or Firm* — McCoy Russell LLP

(57) ABSTRACT

Provided is a three-dimensional rigid ball driving system including: a support frame having a polyhedral shape; a rigid ball positioned at the center of an inner portion of the support frame; a plurality of ball bearings installed at corners of inner sides of the support frame, respectively, and contacting a surface of the rigid ball; and a plurality of electromagnets disposed around the ball bearings and generating magnetic fields to rotate the rigid ball; and a controller controlling the electromagnets to control a rotation direction and a rotation speed of the rigid ball.

5 Claims, 8 Drawing Sheets

(51) Int. Cl.
  *B64G 1/24* (2006.01)
  *G05D 1/08* (2006.01)
  *H02K 16/04* (2006.01)
  *H02K 41/025* (2006.01)
  *H02K 7/08* (2006.01)
  *H02K 17/16* (2006.01)
  *B64G 1/32* (2006.01)

(52) U.S. Cl.
  CPC ........... *H02K 5/173* (2013.01); *H02K 5/1737* (2013.01); *H02K 7/088* (2013.01); *H02K 16/04* (2013.01); *H02K 17/16* (2013.01); *H02K 41/025* (2013.01); *H02K 2201/18* (2013.01)

(58) Field of Classification Search
  CPC ....... B25J 17/0283; H02K 5/17; H02K 5/173; H02K 5/1737; H02K 7/14; H02K 16/00; H02K 16/04; H02K 7/088; H02K 17/16
  See application file for complete search history.

(56) References Cited

U.S. PATENT DOCUMENTS

| | | | | | |
|---|---|---|---|---|---|
| 5,280,225 | A | * | 1/1994 | Pine | B23Q 1/545 310/13 |
| 5,319,577 | A | * | 6/1994 | Lee | B25J 9/126 700/259 |
| 5,798,590 | A | * | 8/1998 | Sakakibara | H02K 41/031 310/156.19 |
| 6,803,738 | B2 | * | 10/2004 | Erten | H02K 41/031 310/103 |
| 2008/0073989 | A1 | * | 3/2008 | Bandera | H02K 7/14 310/80 |
| 2012/0133234 | A1 | * | 5/2012 | Da Costa Balas Ferreira | H02K 7/1853 310/179 |

FOREIGN PATENT DOCUMENTS

| JP | 2008080888 A | 4/2008 |
|---|---|---|
| KR | 1020060007806 A | 1/2006 |
| KR | 1020090116690 A | 11/2009 |

* cited by examiner

[FIG. 1A]
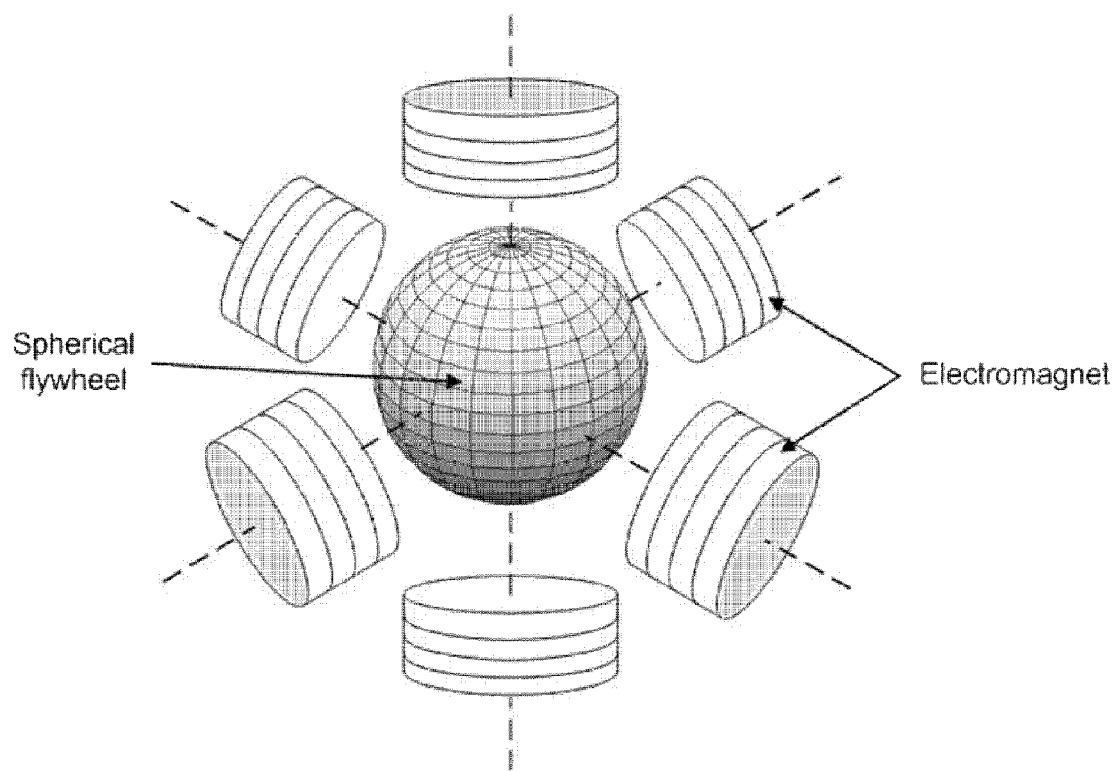

[FIG. 1B]
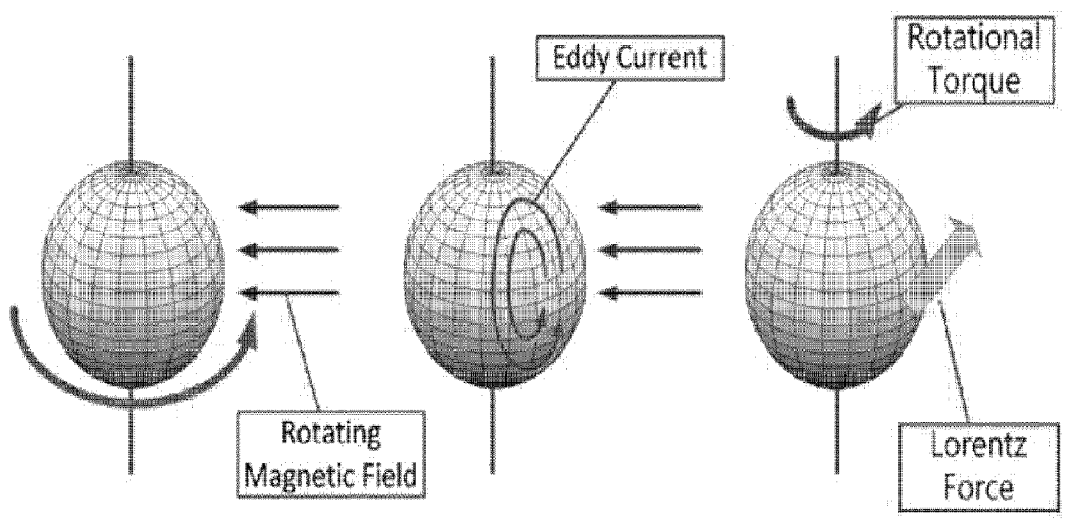

【FIG. 2】
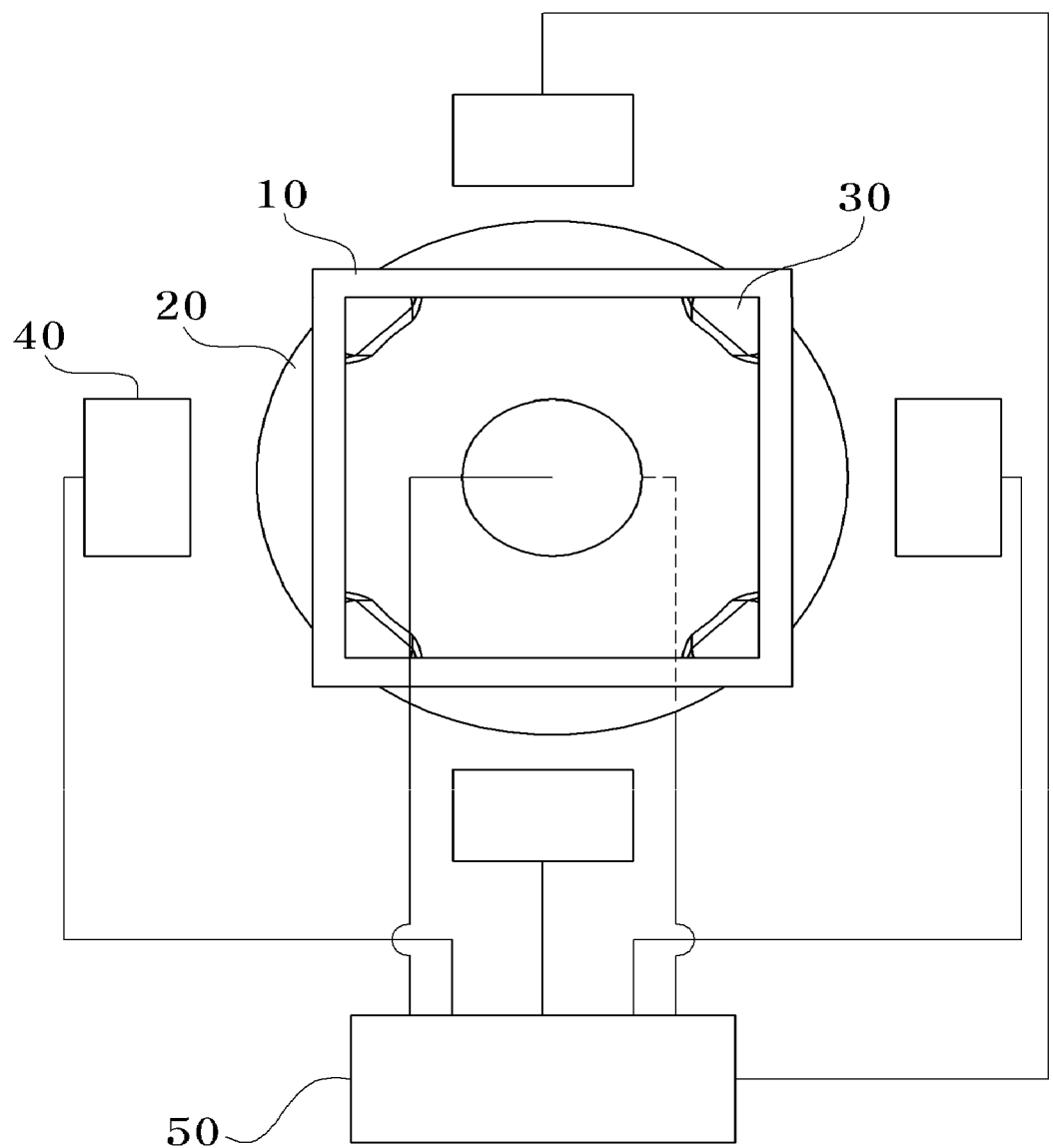

[FIG. 3]
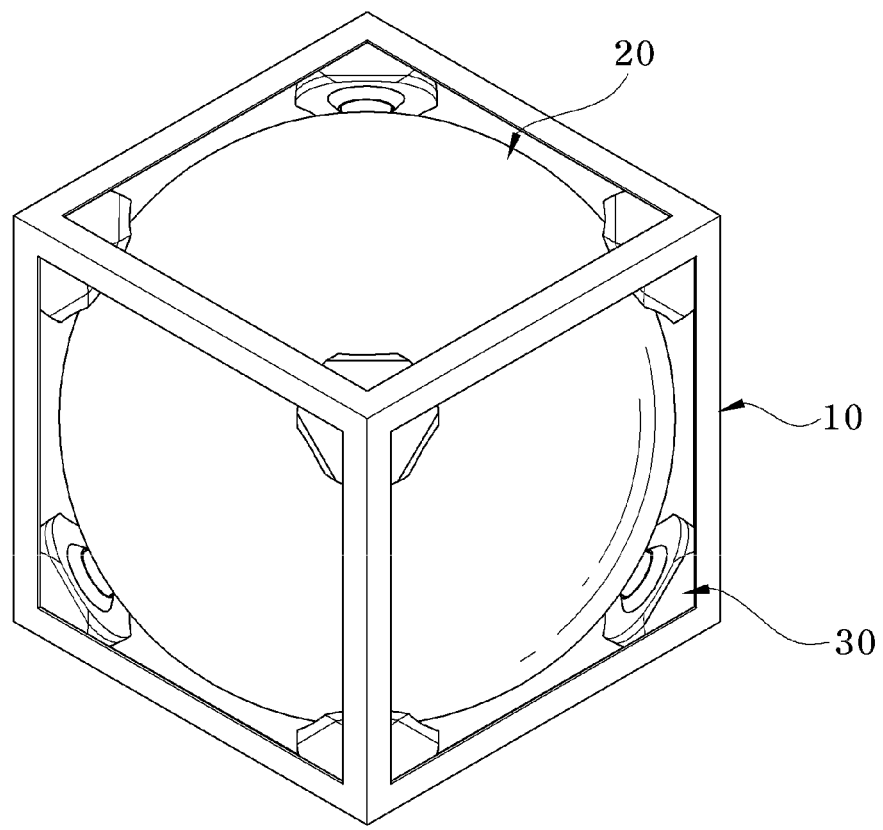

[FIG. 4]
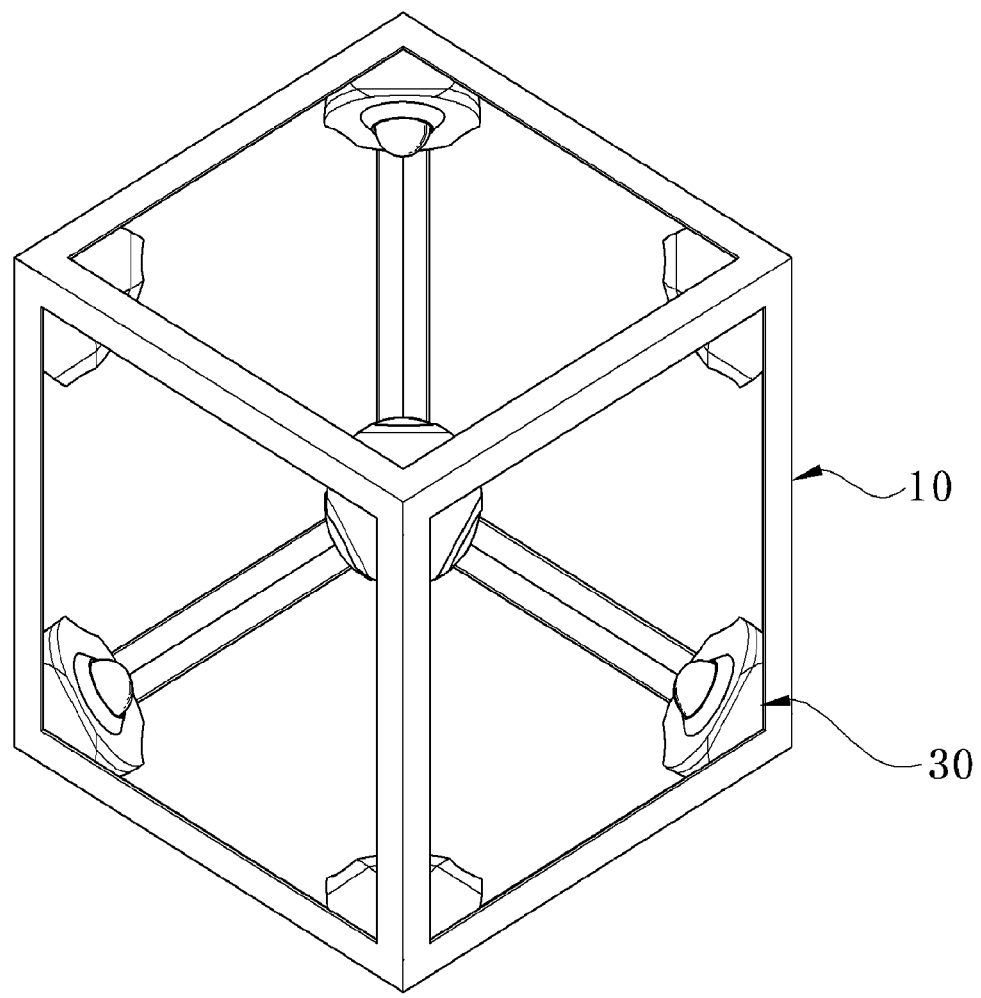

[FIG. 5]
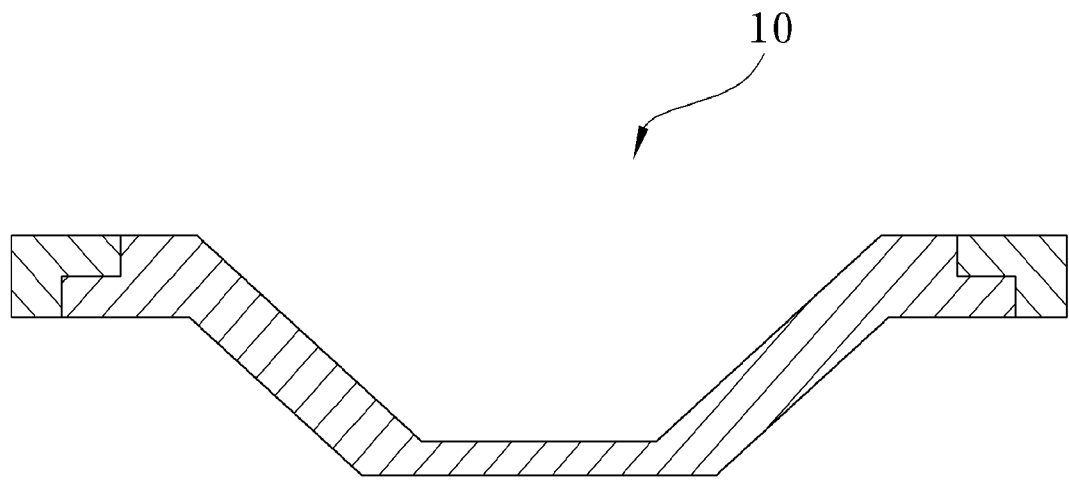

【FIG. 6】
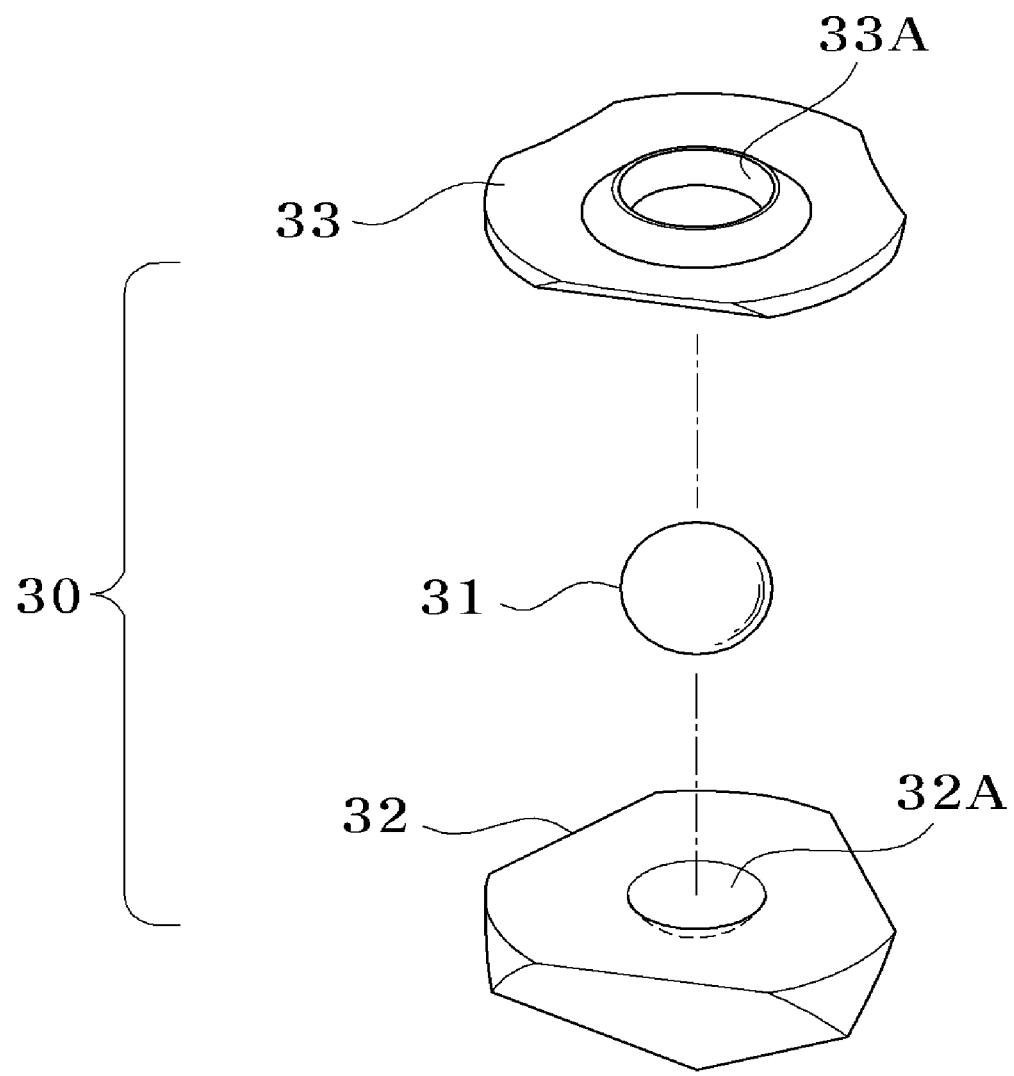

[FIG. 7]
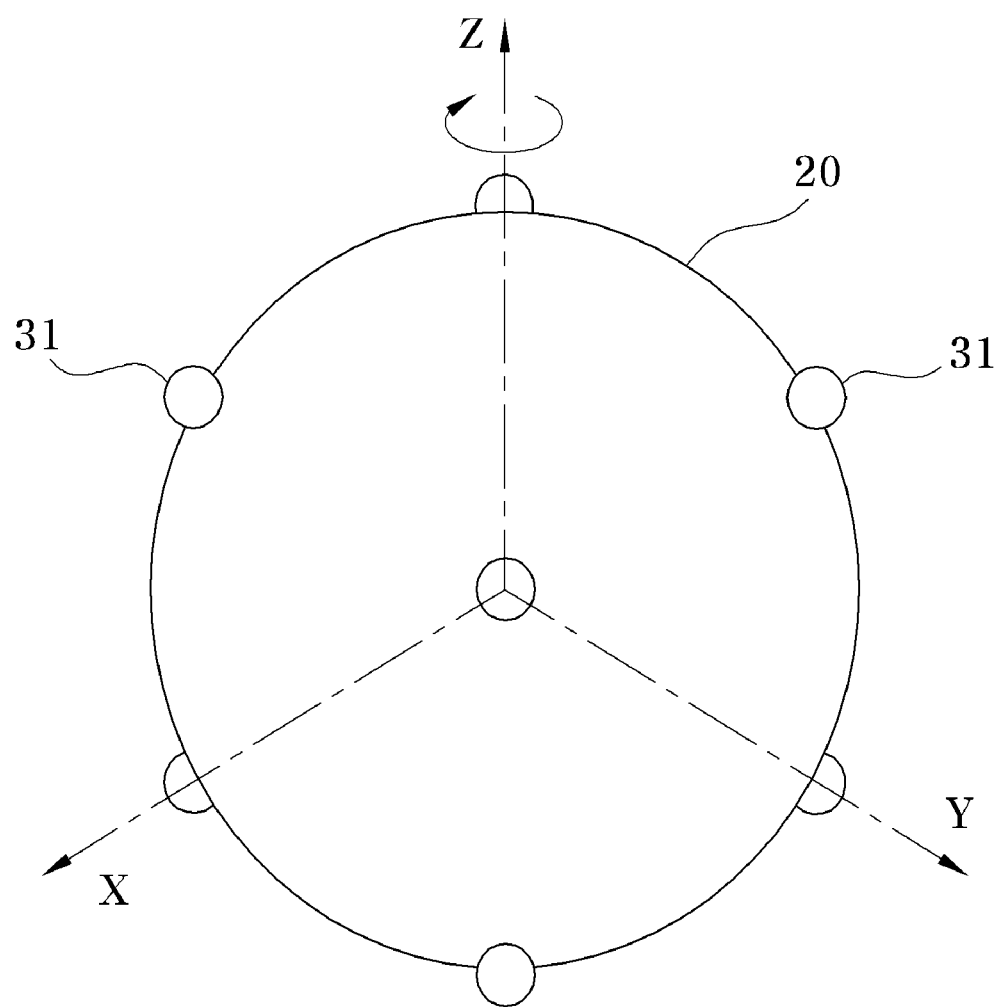

ial Patent Application Serial No. PCT/KR2013/ 006610, entitled "THREE-DIMENSIONAL RIGID BALL DRIVING SYSTEM," filed on Jul. 24, 2013, which claims priority to Korean Patent Application No. 10-2012-0081146, entitled "THREE-DIMENSIONAL RIGID BALL DRIVING SYSTEM," filed on Jul. 25, 2012, the entire contents of each of which are hereby incorporated by reference for all purposes.

TECHNICAL FIELD

The present invention relates to a rigid ball driving system used in order to control an attitude of a satellite, and more particularly, to a three-dimensional rigid ball driving system capable of accurately controlling an attitude of a satellite by positioning a rigid ball used in order to control the attitude of the satellite in three-axis directions at a regular position.

BACKGROUND ART

A satellite such as an artificial satellite acquiring required information while making a predetermined orbit around the earth is provided with an attitude control apparatus so as to perform a task along a given orbit. The attitude control apparatus applies driving force generated by a reaction wheel, a thruster, or the like, to the satellite in an appropriate direction, if necessary, to control an attitude of the satellite.

In order to accurately and precisely control the attitude of the satellite, driving force should be applied in each of three-axis directions of X, Y, and Z axes. Recently, as shown in FIGS. 1A and 1B, research into a satellite attitude control apparatus using a rigid ball in a scheme in which the rigid ball is positioned at a central portion, a plurality of electromagnets are disposed at an interval of 90 degrees around the rigid ball, and a current is periodically applied to the electromagnets to generate a rotating magnetic field in the rigid ball, such that Lorentz's force is generated in the rigid ball to allow driving force to be simultaneously applied to three axes, thereby controlling the attitude of the satellite by only one driver has been actively conducted.

At the time of controlling the attitude of the satellite using the satellite attitude control apparatus using the rigid ball as described above, a simulation is first conducted in order to test reliability and control capability of the satellite attitude control apparatus. To this end, other electromagnets are disposed above the satellite attitude control apparatus, and a current is applied to these electromagnets to allow the rigid ball to be magnetically levitated by generated magnetic fields to stay at a predetermined position without dropping due to gravity.

However, in the satellite attitude control apparatus as described above, since an electromagnet for providing a rotational torque to the rigid ball and two electromagnets for magnetically levitating the rigid ball are disposed above the rigid ball and power is simultaneously applied to these two electromagnets to generate the magnetic fields, interference between the generated magnetic fields by the two electromagnets occurs in that process, such that a rotation control of the rigid ball is not accurate, and a magnetically levitated position of the rigid ball is not constant. Therefore, it is difficult to actually apply the satellite attitude control apparatus as described above.

In addition, the rigid ball is out of a normal position or collides with a component disposed therearound by thrust applied to the satellite when the satellite is launched from the ground and many flight vibrations applied to the satellite until the satellite enters a normal orbit. In this case, the satellite attitude control apparatus may not accurately control the attitude of the satellite or may become an operation-disabled state.

DISCLOSURE

Technical Problem

An object of the present invention is to provide a three-dimensional rigid ball driving system capable of easily performing a simulation on the ground without using a magnetic levitation apparatus and accurately controlling an attitude of a satellite by preventing a rigid ball from being damaged even by launching thrust, vibrations, and the like.

Technical Solution

In one general aspect, a three-dimensional rigid ball driving system includes: a support frame having a polyhedral shape; a rigid ball positioned at the center of an inner portion of the support frame; a plurality of ball bearings installed at corners of inner sides of the support frame, respectively, and contacting a surface of the rigid ball; and a plurality of electromagnets disposed around the ball bearings and generating magnetic fields to rotate the rigid ball; and a controller controlling the electromagnets to control a rotation direction and a rotation speed of the rigid ball.

The ball bearings may include balls, bearing racers installed in the support frame and having grooves having the balls seated therein and having a hemispherical shape, and bearing cages coupled to upper portions of the bearing racers and having guide grooves formed therein and having a hemispherical shape, the balls being installed so as to be confined in grooves formed by allowing the grooves of the bearing racers and the guide grooves of the bearing cages to meet each other.

The ball bearing and the support frame may have a vibration damping member installed therebetween.

A cross section of the support frame in a length direction may have a ' ⌣ ', shape.

Advantageous Effects

In an exemplary embodiment of the present invention, since the rigid ball installed in an attitude control apparatus for controlling an attitude of a satellite is supported by the plurality of ball bearings, a magnetic levitation apparatus for levitating the rigid ball in the air needs not to be separately installed.

In addition, in an exemplary embodiment of the present invention, since the rigid ball is mechanically supported by the plurality of ball bearings, a position of the rigid ball is maintained as it is without damaging the rigid ball even by vibrations, or the like, such that an attitude of the satellite may be accurately controlled.

Further, in an exemplary embodiment of the present invention, the vibration damping member is installed between the ball bearing and the support frame, such that vibrations depending on rotation of the rigid ball are damped.

Furthermore, in an exemplary embodiment of the present invention, the ball bearings do not interfere with an eddy current generated on a surface of the rigid ball. As a result, the electromagnets used in order to generate the magnetic fields may be easily disposed, and an influence of an induced current generated on the surface of the rigid ball may be minimized, such that accuracy in driving the rigid ball is further improved.

In the present invention, since the rigid ball installed in an attitude control apparatus for controlling an attitude of a satellite is supported by the plurality of ball bearings, a magnetic levitation apparatus for levitating the rigid ball in the air needs not to be installed, and a position of the rigid ball is maintained as it is even by vibrations, or the like, such that an attitude of the satellite may be accurately controlled.

DESCRIPTION OF DRAWINGS

FIGS. 1A and 1B are schematic views for describing a rigid ball driving system according to the related art.

FIG. 2 is a configuration diagram showing an example of a three-dimensional rigid ball driving system according to an exemplary embodiment of the present invention.

FIG. 3 is a perspective view showing the example of the three-dimensional rigid ball driving system according to an exemplary embodiment of the present invention.

FIG. 4 is a perspective view showing an example of a support frame according to an exemplary embodiment of the present invention.

FIG. 5 is a cross-sectional view showing another example of a support frame according to an exemplary embodiment of the present invention.

FIG. 6 is an exploded perspective view showing an example of a ball bearing according to the exemplary embodiment of the present invention.

FIG. 7 is a schematic view showing an example for determining a position of a ball according to an exemplary embodiment of the present invention.

BEST MODE

Hereinafter, a configuration of the present invention will be described in more detail with reference to the accompanying drawings showing exemplary embodiments of the present invention.

The present invention is to provide a three-dimensional rigid ball driving system capable of accurately controlling an attitude of a satellite. To this end, the rigid ball driving system according to an exemplary embodiment of the present invention is configured to include a support frame 10, a rigid ball 20, ball bearings 30, electromagnets 40, and a controller 50, as shown in FIG. 2.

The support frame 10, which is a frame having a polyhedral shape in which an inner portion thereof is empty, as shown in FIGS. 3 and 4, has a plurality of ball bearings 30 to be described below installed therein, and a shape of the support frame 10 may be changed into a triangular prismatic shape, a regular hexahedral shape, a regular octahedral shape, an icosahedral shape, or the like, depending on the number and positions of installed ball bearings 30.

Hereinafter, the case in which the support frame 10 is configured in the regular hexahedral shape will be described by way of example.

The support frame 10 has a predetermined length and is configured in the regular hexahedral shape in which each of upper and lower surfaces, left and right surfaces, and front and rear surfaces is opened by connecting shape-steels having a '⌐' shaped cross section, a '⊓' shaped cross section, or a '⊔' shaped cross section to each other so as to be perpendicular to each other.

In addition, the support frame 10 may be implemented so as to have a '⌣' shaped cross section in a length direction, as shown in FIG. 5. Due to this configuration, the support frame 10 has elastic restoring force to apply uniform support to ball bearings 30 to be described below, thereby making it possible to more precisely and accurately support the rigid balls 20.

In addition, a plurality of ball bearings 30 are installed, respectively, at inner sides of corners of the support frame 10 as described above, and the rigid ball 20 positioned at the center of the support frame 10 contacts and is supported by balls 31 of the ball bearings 30 at predetermined points by these ball bearings 30. A method of determining installation of the balls 31 will be described below.

The rigid ball 20 installed at a central portion of an internal space of the support frame 10 and rotated is made of a metal. Here, the rigid ball 20 has a volume enough to be appropriately positioned in the internal space of the support frame 10, as shown in FIG. 3, and an eddy current is generated on a surface of the rigid ball 20 by magnetic fields generated by excitation of a plurality of electromagnets 40 installed around the rigid ball 20, such that the rigid ball 20 may rotate in any direction. Here, a rotation direction and a rotation speed of the rigid ball 20 are controlled by strength, a phase, a supply sequence, and the like, of power applied to the electromagnets 40 by a control of a controller 50 to be described below.

The plurality of ball bearings 30 installed, respectively, at positions symmetrical to each other at the inner sides of the corners of the support frame 10 support the rigid ball 20 positioned at the central portion of the support frame 10, as shown in FIGS. 6 and 7, to allow the rigid ball 20 to be positioned at a predetermined position and allow the rigid ball 20 to freely rotate without being hindered. To this end, the ball bearings 30 according to an exemplary embodiment of the present invention are configured to include the balls 31, bearing racers 32, and bearing cages 33. Here, the ball bearings 30 may be installed at each corner of the support frame 10 or be installed at only some of the corners of the support frame 10, depending on the number thereof.

In addition, although the case in which the ball bearings 30 are installed at the corners of the support frame 10 has been described above, the ball bearings 30 may also be installed at central portions of the support frame 10 or at both of the corners and the central portions of the support frame 10, if necessary.

The bearing racer 32 is firmly installed at and fixed to the inner side of the corner of the support frame 10 through a coupling member simultaneously with supporting a lower portion of the ball 31 and has a groove 32A formed at a central portion thereof so that the ball 31 may be seated therein and having a hemispherical shape. In addition, when the bearing racer 32 is installed at each corner of the frame, it may be installed on a plane perpendicular to a line connecting each corner of the frame and the center of the rigid ball 20 to each other. In addition, the coupling member fixing the bearing racer 32 to the corner of the support frame 10 may be configured of a bolt and a nut to be implemented so as to be attachable to or detachable from the support frame 10 or to be implemented so as to be semi-permanently fixed to the support frame 10 through welding.

The bearing cage 33 is a member installed on the bearing racer 32 to enclose the ball 31 seated in the groove 32A of the bearing racer 32, thereby making it possible to prevent separation of the ball 31 and allow the ball to smoothly rotate. To this end, the bearing cage 33 has a guide groove 33A formed at a central portion thereof so that the ball 31 is seated therein and having a hemispherical shape, and is firmly fixed to the above-mentioned bearing racer 32 through a coupling member. Here, the coupling member may also be implemented as a bolt and a nut or be implemented by welding as in the bearing racer 32.

In addition, a spherical groove formed by allowing the semi-spherical groove 32A of the bearing racer 32 and the semi-spherical guide groove 33A of the bearing cage 33 to meet each other has the ball 31 seated therein.

Meanwhile, when the rigid ball 20 rotates by magnetic fields generated by the electromagnets installed around the rigid ball 20, minute vibrations may be generated in the rigid ball. In this case, the vibrations may be transferred to a satellite through the ball bearings 30. Therefore, it is preferable that a vibration damping member such as a damper, an isolator, or the like, is installed between the ball bearing 30 and the support frame 10 in order to prevent the vibrations from being transferred to the satellite.

In addition, the ball bearing 30 has a size enough not to interfere with the eddy current generated on the surface of the rigid ball 20 by the excitation of the electromagnet 40. Here, the size of the ball bearing 30 enough not to interfere with the eddy current is changed depending on a diameter of the rigid ball 20, a distance between the electromagnet and the rigid ball 20, and the like.

Further, the ball bearings 30 are installed at each corner of the support frame 10, such that they have a structure in which they are symmetrical to each other. As a result, the rigid ball 20 is stably supported by the ball bearings 30, and a load applied to the rigid ball 20 is uniformly dispersed.

In order to accomplish the effect as described above, that is, an effect that the rigid ball 20 is stably supported by the ball bearings 30 and the load applied to the rigid ball 20 is uniformly dispersed, installation positions of the ball bearing 30 need to be determined so that the balls 31 of the ball bearings 30 point-contact the surface of the rigid ball 20, as shown in FIG. 7, which will be described below.

In the case in which a radius of the rigid ball 20 is R, the surface of the rigid ball 20 is positioned at positions spaced apart from (X, Y, Z) by the same distance R in coordinate axes having an origin positioned at a central point of the rigid ball, as seen from the following Equation 1. Therefore, points at which the rigid ball meets coordinate axes (X, Y, Z) are represented by the following Equation 2.

$$R=\sqrt{X^2+Y^2+Z^2} \qquad \text{[Equation 1]}$$

Here, R indicates a radius of the rigid ball 20, and X, Y, and Z indicate coordinate values of points at which the rigid ball 20 meets an X coordinate axis, a Y coordinate axis, and a Z coordinate axis.

However, since a condition for accomplishing symmetry in the above Equation is X=Y=Z, the coordinate values of the points at which the rigid ball 20 meets the X coordinate axis, the Y coordinate axis, and the Z coordinate axis are represented by the following Equation 2.

$$X = \pm \frac{R}{\sqrt{(3)}}, Y = \pm \frac{R}{\sqrt{(3)}}, Z = \pm \frac{R}{\sqrt{(3)}} \qquad \text{[Equation 2]}$$

Here, in the case in which a radius of the ball 31 of the ball bearing 30 is r, coordinate values of points at which the centers of the balls 31 are positioned are represented by the following Equation 3.

$$X = \pm \frac{R+r}{\sqrt{(3)}}, Y = \pm \frac{R+r}{\sqrt{(3)}}, Z = \pm \frac{R+r}{\sqrt{(3)}} \qquad \text{[Equation 3]}$$

Here, X, Y, and Z are coordinate values of points at which the centers of the balls 31 of the ball bearings 30 are positioned, R is a radius of the rigid ball 20, and r is a radius of the ball 31 of the ball bearing 30.

In addition, the controller 50 that is connected to the electromagnets arranged around the rigid ball 20 and generating magnetic force to rotate the rigid ball 20 and controls the rigid ball driving system controls the rotation speed, the rotation direction, and the like, of the rigid ball 20, as described above. Here, the controller 50 is provided with a speed measurer such as a tachometer, or the like, in order to detect and control a rotation speed of the rigid ball 30.

As described above, in an exemplary embodiment of the present invention, since the rigid ball installed in an attitude control apparatus for controlling an attitude of a satellite is supported by the plurality of ball bearings, a magnetic levitation apparatus for levitating the rigid ball in the air needs not to be installed, a position of the rigid ball is maintained as it is without damaging the rigid ball even by vibrations, or the like, such that an attitude of the satellite may be accurately controlled.

[Detailed Description of Main Elements]

| | |
|---|---|
| 10: support frame | 20: rigid ball |
| 30: ball bearing | 31: ball |
| 32: bearing racer | 32A: groove |
| 33: bearing cage | 33A: guide groove |
| 40: electromagnet | 50: controller |

The invention claimed is:
1. A three-dimensional rigid ball driving system comprising:
 a support frame (10) having a polyhedral shape;
 a rigid ball (20) positioned at the center of an inner portion of the support frame (10);
 a plurality of ball bearings (30) installed at corners of inner sides of the support frame (10), respectively, and contacting a surface of the rigid ball (20);
 a plurality of electromagnets (40) disposed around the ball bearings (30) and generating magnetic fields to rotate the rigid ball (20); and
 a controller (50) controlling the electromagnets (40) to control a rotation direction and a rotation speed of the rigid ball (20),
 wherein the ball bearings (30) include balls (31), bearing racers (32) installed in the support frame (10) and having grooves (32A) having the balls (31) seated therein and having a hemispherical shape, and bearing cages (33) coupled to upper portions of the bearing racers (32) and having guide grooves (33A) formed therein and having a hemispherical shape,
 the balls (31) being installed so as to be confined in grooves formed by allowing the grooves (32A) of the bearing racers (32) and the guide grooves (33A) of the bearing cages (33) to meet each other.

2. The three-dimensional rigid ball driving system of claim 1, wherein centers of the balls (31) are positioned at points defined by following Equation 3:

$$X = \pm \frac{R+r}{\sqrt{(3)}}, Y = \pm \frac{R+r}{\sqrt{(3)}}, Z = \pm \frac{R+r}{\sqrt{(3)}} \quad \text{[Equation 3]}$$

where X, Y, and Z are coordinate values of points at which the centers of the balls (31) of the ball bearings (30) are positioned, R is a radius of the rigid ball (20), and r is a radius of the ball (31) of the ball bearing (30).

3. The three-dimensional rigid ball driving system of claim 1, wherein the ball bearing (30) and the support frame (10) have a vibration damping member installed therebetween.

4. The three-dimensional rigid ball driving system of claim 1, wherein a cross section of the support frame in a length direction has a '⌣' shape.

5. A three-dimensional rigid ball driving system comprising:
- a support frame (10) having a polyhedral shape;
- a rigid ball (20) positioned at the center of an inner portion of the support frame (10);
- a plurality of ball bearings (30) installed at corners of inner sides of the support frame (10), respectively, and contacting a surface of the rigid ball (20);
- a plurality of electromagnets (40) disposed around the ball bearings (30) and generating magnetic fields to rotate the rigid ball (20); and
- a controller (50) controlling the electromagnets (40) to control a rotation direction and a rotation speed of the rigid ball (20), wherein a cross section of the support frame in a length direction has a '⌣' shape.

* * * * *